(12) United States Patent
Straub et al.

(10) Patent No.: US 9,648,366 B2
(45) Date of Patent: *May 9, 2017

(54) MANAGEMENT METHODS OF A VIDEO DEVICE AND CORRESPONDING VIDEO DEVICE

(71) Applicant: THOMSON LICENSING, Boulogne-Billancourt (FR)

(72) Inventors: Gilles Straub, Acigne (FR); Nicolas Caramelli, Rennes (FR)

(73) Assignee: Thomson Licensing, Issy-les-Moulineaux (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/733,003

(22) Filed: Jun. 8, 2015

(65) Prior Publication Data
US 2015/0271539 A1 Sep. 24, 2015

Related U.S. Application Data

(63) Continuation of application No. 12/450,929, filed as application No. PCT/EP2008/053505 on Mar. 25, 2008, now Pat. No. 9,055,261.

(30) Foreign Application Priority Data

Apr. 20, 2007 (EP) .................................... 07300968

(51) Int. Cl.
H04N 21/6583 (2011.01)
H04N 21/61 (2011.01)
(Continued)

(52) U.S. Cl.
CPC ......... *H04N 21/25808* (2013.01); *H04N 5/50* (2013.01); *H04N 21/4383* (2013.01);
(Continued)

(58) Field of Classification Search
CPC .......... H04N 21/4345; H04N 21/4524; H04N 21/4383; H04N 21/6543; H04N 5/50;
(Continued)

(56) References Cited

U.S. PATENT DOCUMENTS 6,583,825 B1 * 6/2003 Kwoh .................... G04G 5/002
348/731
7,865,581 B2 * 1/2011 Straub ................. H04L 12/2803
709/221
(Continued)

FOREIGN PATENT DOCUMENTS

FR 2865598 7/2005
GB 0320075 8/2006
(Continued)

OTHER PUBLICATIONS

Hata et al: "A study on integration of mobile communication and tv broadcasting systems operating in UHF band", TENCON 2004. 2004 IEEE Region 10 Conference, Chiang Mai, Thailand, Nov. 21-24, 2004, pp. 549-552.

(Continued)

*Primary Examiner* — Benjamin R Bruckart
*Assistant Examiner* — Tien M Nguyen
(74) *Attorney, Agent, or Firm* — Myers Wolin LLC

(57) ABSTRACT

The invention relates to the remote management of a digital terrestrial television device. In order to improve the terrestrial television reception, a control command is transmitted by a distant remote management server through another communication channel, the control command requesting the video device to set at least a digital terrestrial television parameter related to a service list management.

21 Claims, 7 Drawing Sheets

(51) Int. Cl.
| | |
|---|---|
| H04N 21/643 | (2011.01) |
| H04N 21/258 | (2011.01) |
| H04N 5/50 | (2006.01) |
| H04N 21/438 | (2011.01) |
| H04N 21/6543 | (2011.01) |
| H04N 21/658 | (2011.01) |

(52) U.S. Cl.
CPC ..... *H04N 21/6112* (2013.01); *H04N 21/6162* (2013.01); *H04N 21/64322* (2013.01); *H04N 21/6543* (2013.01); *H04N 21/6582* (2013.01); *H04N 21/6583* (2013.01)

(58) Field of Classification Search
CPC ......... H04N 21/25808; H04N 21/6112; H04N 21/6162; H04N 21/64322; H04N 21/6582; H04N 21/6583
See application file for complete search history.

(56) References Cited

U.S. PATENT DOCUMENTS

| | | | |
|---|---|---|---|
| 9,055,261 B2* | 6/2015 | Straub | H04N 5/50 |
| 2002/0154623 A1* | 10/2002 | Hundemer | H04H 20/42 |
| | | | 370/349 |
| 2006/0053458 A1* | 3/2006 | Borseth | H04N 5/50 |
| | | | 725/100 |
| 2007/0067816 A1* | 3/2007 | Van Horck | H03J 1/0091 |
| | | | 725/100 |

FOREIGN PATENT DOCUMENTS

| | | |
|---|---|---|
| JP | 2000115742 | 4/2000 |
| JP | 2001236282 | 8/2001 |
| JP | 2003115816 | 4/2003 |
| JP | 2006129183 | 5/2006 |
| JP | 2006304134 | 11/2006 |
| WO | WO 2006/108685 | 10/2006 |
| WO | WO2006108685 | 10/2006 |
| WO | WO2007034381 | 3/2007 |

OTHER PUBLICATIONS

Kim et al: "Performance improvement of a decision feedback equalizer in terrestrial dtv receivers by reduction of error propagation", 2004 IEEE International Symposium on Consumer Electronics, Reading, UK, Sep. 1-3, 2004, pp. 236-240.

Macher et al: "Multi program transport stream switching management and switching solutions", SMPTE Motion Imaging Journal, vol. 112, No. 4, pp. 122-128, Apr. 2003.

Miao et al: "Profit oriented multichannel resource management for integrated internet and dvb t network", GLOBECOM '05. IEEE Global Telecommunications Conference, Piscataway, NJ, USA, Nov. 28-Dec. 2, 2005, pp. 678-682.

"Transmitter control unit r&s NetCCU(R) 700: all-purpose instrument with integrated DVB-T receiver module", News from Rohde and Schwarz, vol. 45, No. 185, pp. 34-37, 2005.

Eriksson: "Dynamic single frequency networks", IEEE Journal on Selected Areas in Communications, vol. 19, No. 10, pp. 1905-1914, Oct. 2001.

Eriksson: "Evaluation of packet by packet downlink radio resource management scheme", IEEE VTS 53rd Vehicular Technology Conference, Spring 2001, Pt. vol. 2, pp. 967-971 vol. 2, Piscataway, NJ, USA, May 6-9, 2001.

Quacchia etal: "Data model for a TR 069 enabled STB", for CPE DSL Home technical working group, WT-135, Revision 8, Mar. 2007, pp. 1-57.

Bernstein et al., "Data model template for TR 069 enabled devices", DSL forum TR-106 amendment 1, Nov. 2006, pp. 1-37.

"TR 069 CPE WAN management protocol v1.1", version: issue 1 amendment 1, Nov. 2006, pp. 1-131.

Weiss et al: "Analysis and modelling of mobile terrestrial networks with COFDM", Codierung fur Quelle, Kanal und Ubertragung (Source, Channel and Transmission Coding), Aachen, Germany, Mar. 3-5, 1998, pp. 195-200.

Cesky: "Support of introduction of digital broadcasting in Europe", : Fifteenth International Wroclaw Symposium and Exhibition. Electromagnetic Compatibility 2000, Pt. vol. 2, pp. 721-723 vol. 2, Wroclaw, Poland, Jun. 27-30, 2000.

Bruhns: "Background on XCAP and SIP UA profile delivery", Jun. 30, 2006, pp. 1-10.

DVB TM IPI RMS Task force: "Provisioning activation configuration and management", Jun. 22, 2006, pp. 1-10.

Paulke et al: "Hardware for control of broadcasting systems", Fernseh- und Kino-Technik, vol. 58, No. 8-9, pp. 422-424, 2004.

Bathrick, G.,"DSLHome Data Model Template for TR-069-Enabled Devices", DSLHome-Technical Working Group, DSL Forum TR-106, Sep. 1, 2005, pp. 1-30.

Bathrick, G. et al., "CPE WAN Management Protocol", DSLHome-Technical Working Group, DSL Forum TR-069, May 1, 2004, pp. 1-109.

Search Report Dated Jul. 2, 2009.

* cited by examiner

MANAGEMENT METHODS OF A VIDEO DEVICE AND CORRESPONDING VIDEO DEVICE

This application is a continuation of U.S. application Ser. No. 12/450,929 filed Jan. 19, 2010, now allowed, which claims the benefit, under 35 U.S.C. 365 of International Application PCT/EP2008/053505 filed Mar. 25, 2008, which was published in accordance with PCT Article 21(2) on Oct. 30, 2008 under international publication number WO2008/128843 in English and which claims the benefit of European patent application No. 07300968.0, filed Apr. 20, 2007. The applications are incorporated by reference.

1. INVENTION FIELD

Present invention is related to the field of digital television and more precisely to management of a video device (e.g. a set top box (or STB)) receiving a Digital Terrestrial Television (or DTT) signal.

2. TECHNOLOGICAL BACKGROUND

DTT corresponds for instance to DVB-T (Digital Video Broadcast-Terrestrial) in some countries (such as in Europe) or Terrestrial ATSC (Advanced Television Systems Committee) in the USA, or ISDB-T (Integrated Services Digital Broadcasting-Terrestrial) in Japan.

During the first use of a video device receiving a DTT signal, the video device usually scans the frequencies, where a DTT signal is present. Then, it can receive the corresponding services.

Patent document published under reference US2007/0067816A1 discloses a DTT receiver, that stores frequency data for different transmission standards, as well as a country or region setting based on the location of the receiver.

These technologies have the drawback that the video device reception of a DTT service is not optimized.

3. INVENTION SUMMARY

The object of the invention is to alleviate these disadvantages of the prior art.

More precisely, the aim of the invention is to optimize the DTT reception of service in a video device.

Consequently, the invention proposes a management method in a remote management server enabling the server to manage at least a distant video device adapted to receive a digital terrestrial television signal through a radio channel and to receive frames from the management server through a second communication channel. In order to optimize the DTT reception, the method comprises a transmission of a control command through the second communication channel requesting the video device to set at least a digital terrestrial television parameter related to a service list management.

According to a specific feature, the set of at least a digital terrestrial television parameter comprises the sending of a request for the video device to scan at least a digital terrestrial television frequency.

According to another specific feature, the set of at least a digital terrestrial television parameter comprises the sending of a request for the video device to associate at least a digital terrestrial television logical channel to a digital terrestrial television service coordinate.

The invention concerns also a management method in a video device adapted to receive a digital terrestrial television signal through a radio channel and to receive data from the distant remote management server through a second communication channel. In order to optimize the reception, the method comprises the following steps:

- a reception of a control command through the second communication channel requesting the video device to set at least a digital terrestrial television parameter related to a digital terrestrial television service list management; and
- the setting of the at least digital terrestrial television parameter related to a digital terrestrial television service list management.

According to a specific feature, the control command comprises a request for the video device to scan at least a digital terrestrial television frequency and the setting step comprises the scan of the at least a digital terrestrial television parameter.

According to another specific feature, the control command comprises a request for the video device to associate at least a digital terrestrial television logical channel to a digital terrestrial television service coordinate.

Advantageously, the method includes the transmission of information related to a digital terrestrial television service list management to the management server through the second communication channel.

According to an advantageous feature, the second communication channel is of Internet Protocol type and/or the control command is received according to a CPE WAN Management Protocol.

The invention relates also to the corresponding video device. The video device comprises a receiver of a digital terrestrial television signal through a radio channel and a receiver of data from the distant remote management server through a second communication channel. To optimize its DTT reception, the device comprises means for setting the one or several digital terrestrial television parameters related to a digital terrestrial television service list management according to a control command received through the second communication channel and requesting the video device to set the digital terrestrial television parameter(s) related to a service list management.

4. LIST OF FIGURES

The invention will be better understood and other features and advantages will appear on reading the following description, the description making reference to the appended drawings amongst which:

5. DETAILED DESCRIPTION OF THE INVENTION

Figure 1:
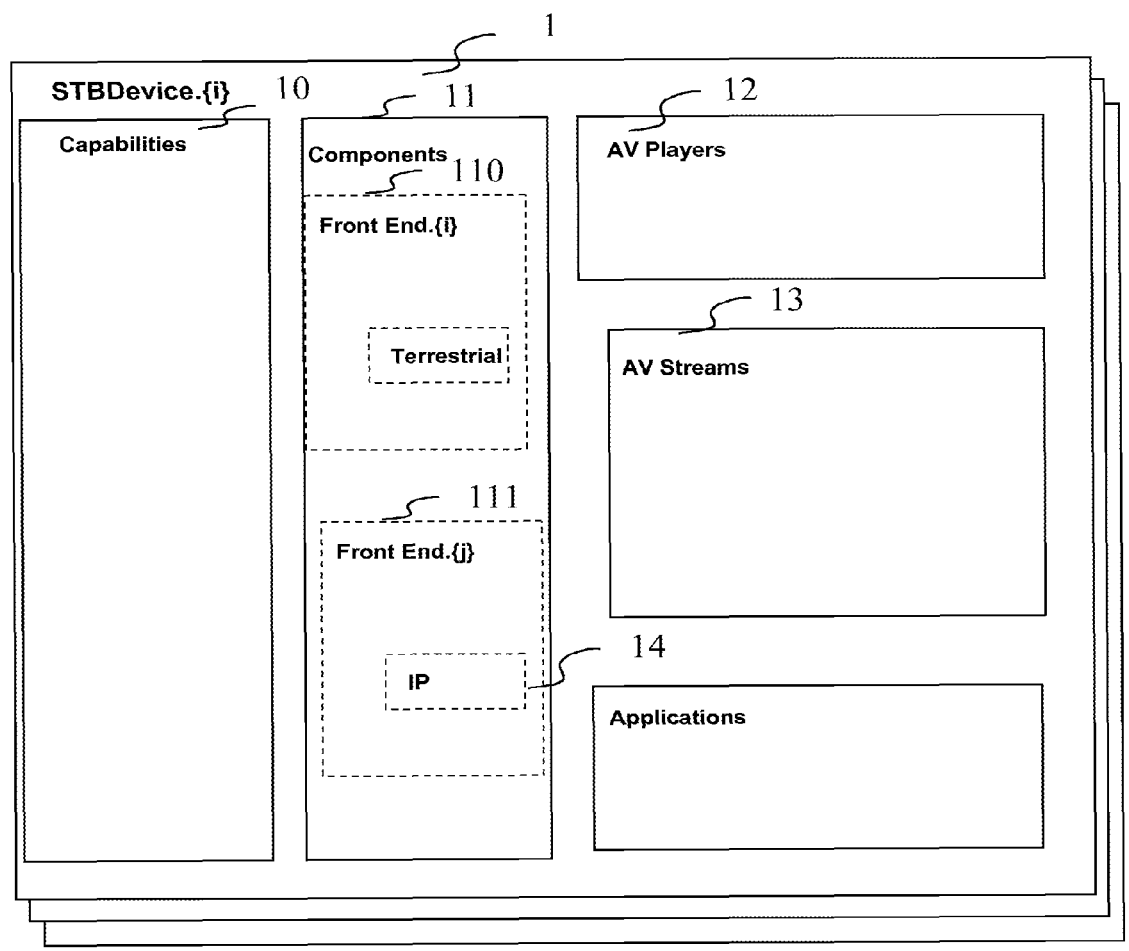
FIG. 1 illustrates a video Device object structure according to a particular embodiment of the invention.

According to the invention, the setting of one or several digital terrestrial television parameters related to a service list management in a video device can be remotely managed. This remote management can for example be used for an association between a DTT service and a service coordinate. It can also be used so that it receives specific frequencies used by DTT transmission. According to state of the art, service list installation is always user initiated. When something wrong happens, or a problem occurs on the STB (Set Top Box), and if a re-installation of the service list is required, the user has to do it by himself. It may also happen that the set of transmitters in the area of the STB changes, and that new ones appear, so that it may be useful to re-trigger a service installation on the STB. Currently this has always to be user initiated. The invention enables a remote management that enables a configuration initiated automatically or under control of a distant operator.

According to one aspect of the invention, a frequency map for the service list installation is remotely transmitted by a server to a video device. This gives the advantage of increasing the speed of the installation because it reduces the set of frequencies to be scanned. In addition, this operation can be transparent for the video device user. Advantageously, the frequency map specifies one or several frequency bands (or ranges) to be scanned. These bands can be defined with a start frequency and a stop frequency or a start (or stop) frequency and size. For countries where there could be discontinuous frequency maps, then a complete installation can be done by forcing successive scans on several and different frequency ranges.

According to another aspect of the invention, association between a DTT service (logical channel) and a service coordinate (e.g. a DVB triplet in case of DVB-T) (if there are several service coordinates for one service) within a video device is remotely controlled by a configuration server.

In a specific embodiment of the invention, data models are used and represent objects. They allow a help desk operator controlling a server to assist a user and to troubleshoot his service list installation & configuration. They also allow a distant configuration server to manage the parameters related to a service list management in a video device. These parameters include the DTT frequency bands that the video device is allowed to scan (typically for a DTT service list installation), the association between a DTT logical channel and a DTT service coordinate, the connection to a determined DTT logical channel and/or to a determined DTT service coordinate.

This data model is to be used in conjunction with TR-069 CWMP protocol as defined by the DSL Forum.

A CPE (or Customer Premises Equipment) WAN (or Wide Area Network) Remote Management Protocol also called CWMP is defined in DSL (or Data Subscriber Line) Forum Technical report referred as TR-069. TR-069 (entitled "CPE WAN Management Protocol", DSL Forum Technical Report, published on May 2004 and amended in 2006) defines a remote management protocol stack. TR 106 (Generic data model compliant to TR-069) defines a generic data model applicable to any kind of device.

A remote management draft standard (referred as WT-135) exists for the STB and is compliant to TR-069. This draft standard does not cover the remote management of DTT service lists.

In particular, the present patent specification defines an extension to the data model specified in WT-135 (current version v8). According to the invention, this extension enables to configure various parameters allowing the DTT services on a video device.

The following terminology is used throughout this document:
ACS or Auto-Configuration Server: this is a component in the broadband network responsible for auto-configuration of the CPE for advanced services;
CPE or Customer Premises Equipment;
Parameter: A name-value pair representing a manageable CPE parameter made accessible to an ACS for reading and/or writing;
STB or Set Top Box: this device contains Audio Video decoders and is intended to be connected to Analog TV and or Home Theaters.

This document defines an example of STB Device data model extensions associated with the provisioning objects for DTT services management. Advantageously, device object adheres to all of the data-hierarchy requirements defined in TR106. In the context of TR106, the STB Device object is a top-level application-specific object (an Application Object as defined in the formal data-hierarchy definition). As such, individual CPE devices may contain one or more of these objects within their Root Object along side the generic data objects defined in TR106.

FIG. 1 illustrates a Device object structure 1 (the device is, for example, a Set Top Box) according to a particular embodiment of the invention.

Each STB or video device can manage its configuration and data according to FIG. 1. A remote server can have an object structure (entirely or partially) for some or all video devices that it can control, as illustrated in FIG. 1.

The object structure 1 that can be implemented in software or hardware comprises different sub-structures including capabilities structure 10, components structure 11, audio/video players structures 12, audio/video stream structures 13 and applications structures 14. These structures are defined in WT-135.

Components structure 11 is related to capabilities of each front end (referred as Front End.{i} or Front End.{j}) regarding terrestrial components (Front End.{i}.Terrestrial 110) or IP components (Front End.{j}.IP 111). The invention defines specific terrestrial components that are read and/or updated remotely by a remote server (eg ACS).

Figure 2:
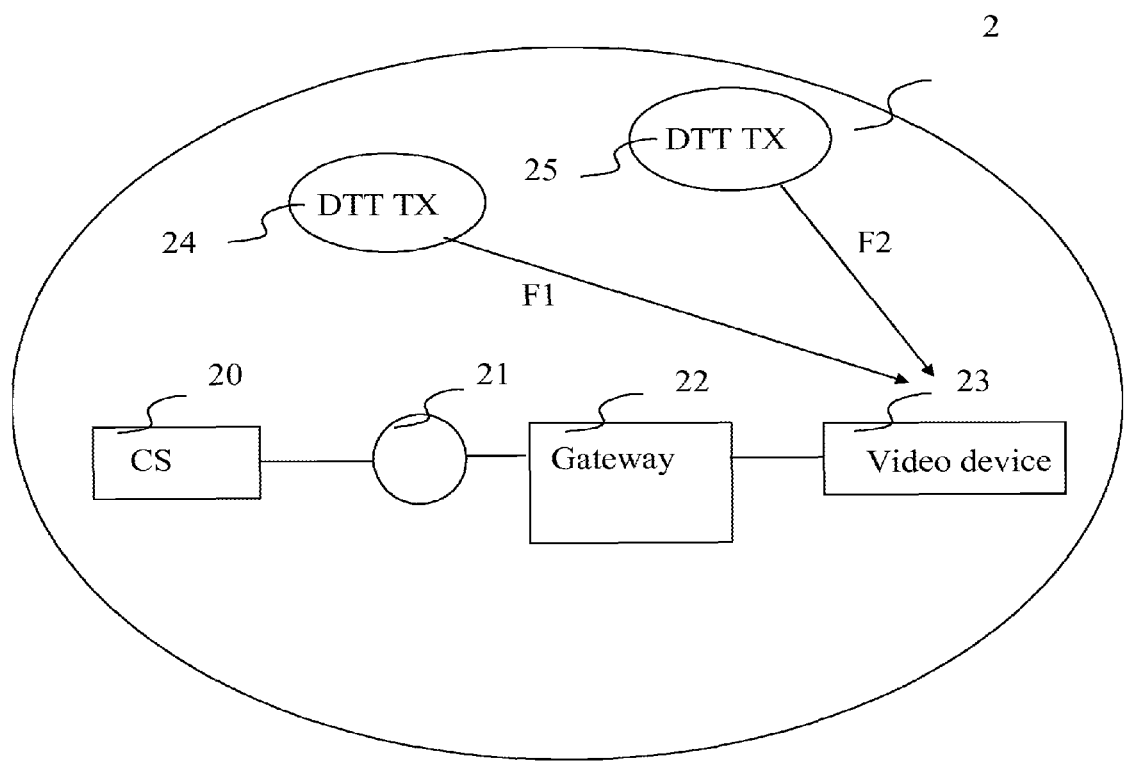
FIG. 2 illustrates a network architecture implementing the video device object structure according to FIG. 1.

FIG. 2 illustrates a network architecture 2 that comprises:
at least a configuration server (e.g. an ACS) 20;
a network core 21 (e.g. a wide area network (e.g. an ADSL (Asymmetric Digital Subscriber Line) network));
two DTT transmitters 24 and 25; and
one or several video devices 23 (e.g. set top boxes) associated each to a gateway 22 (video device 23 and associated gateway 22 are either embedded as part of an Internet Gateway Device, as defined in TR-069, or standalone devices, i.e. the device 23 and the gateway 22 can be made in one or two separate devices) (as a variant of the invention, if a video device 23 is not compliant with TR069, a dedicated proxy can be inserted between gateway 22 and device 23).

The video devices 23 and the configuration server are communicating through the gateway 22 and the network core 21. The video devices 23 are implementing the video device object structure according to FIG. 1. Advantageously, the channel between the video devices 23 and distant server 20 is of Internet Protocol type. This enables an easy communication between the distant server 20 and video devices 23 with a return channel and compliancy with remote management protocols that can be adapted to the invention.

The DTT transmitters 24 and 25 are using specific frequencies (respectively denoted F1 and F2) to transmit DTT services to video devices. The video device 23 is adapted to receive the services broadcast by transmitter 24 and 25.

Figure 3:
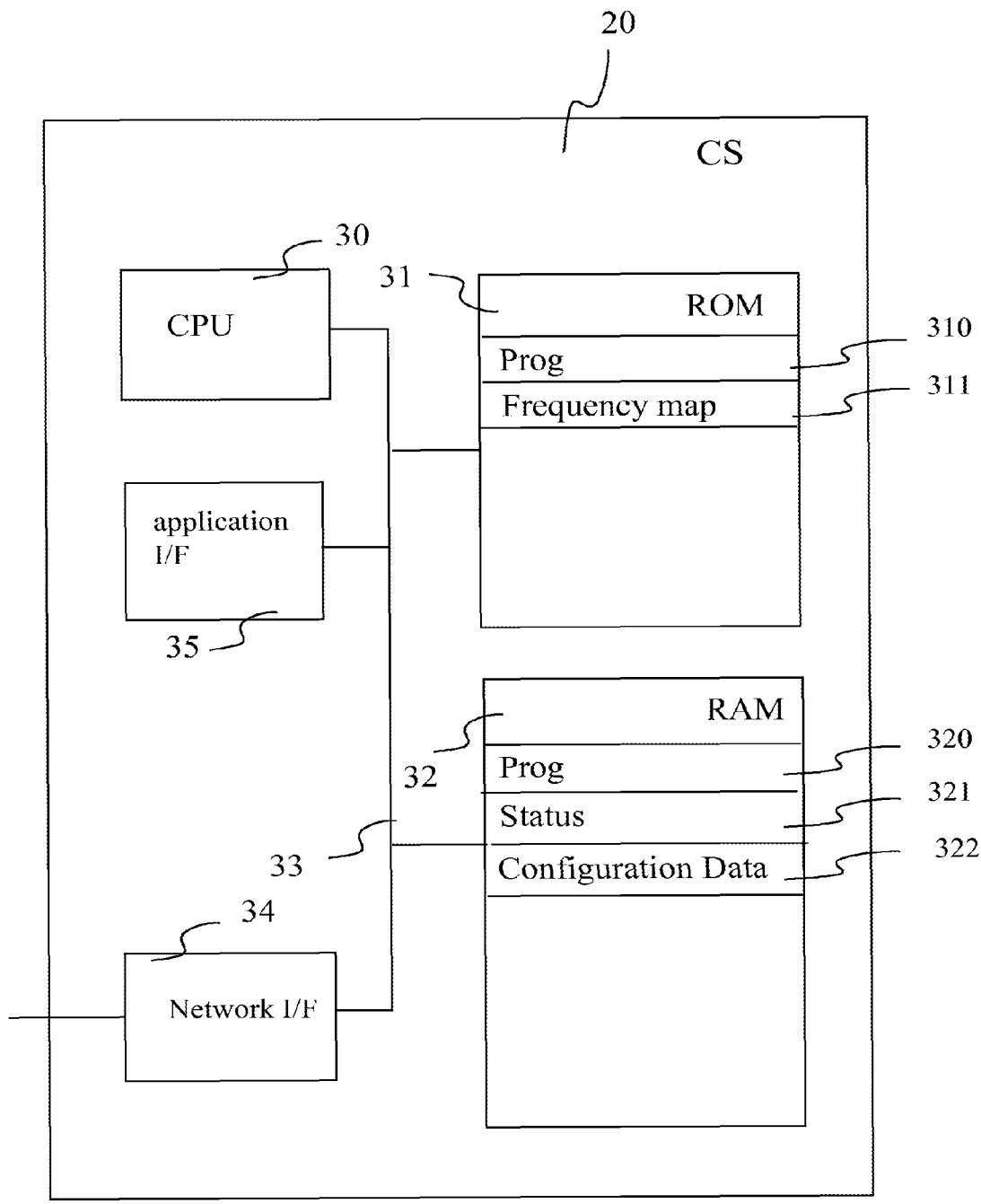
FIGS. 3 and 4 shows respectively a configuration server and a video device according to particular embodiments of the invention and belonging to the network of FIG. 2.

FIG. 3 illustrates schematically the configuration server 20. The server 21, comprises:
- a microprocessor 30 (or CPU);
- a non-volatile memory of type ROM (Read Only Memory) (or hard disk) 31;
- a random access memory or RAM 32; et
- an application interface Internet 35 enabling communication with a user or control machine;
- a network interface 34 enabling to exchange (send to and/or receive from) data or control frames (typically CWPM frames) with a video device 23 through the core network 21;
- a data and address bus 33 linking elements 30 to 32, 34 and 35.

<<Register>> word used here can correspond in RAM 32 or ROM 31 to a memory area of small size (a few binary data) or a large memory area (e.g. a program or audio/video data).

Figure 5:
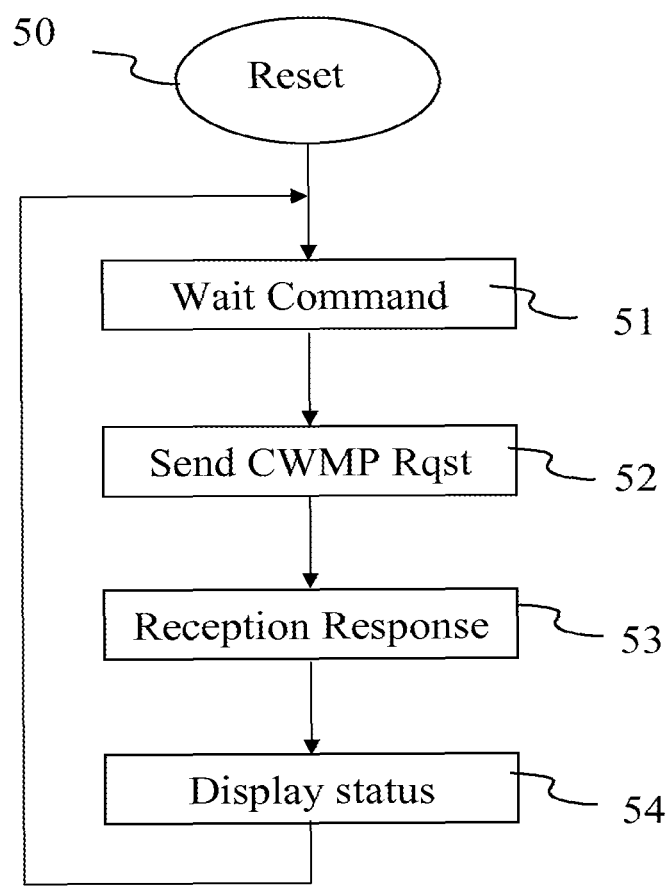
FIGS. 5 and 6 illustrates each a method that is implemented respectively in the server of FIG. 3 and the video device of FIG. 4, according to the specific embodiments of the invention.

The ROM 31 comprises a program 310 and information representative of frequency map 311 used by DTT transmitters. The algorithm implementing the method of FIG. 5 is stored in ROM 61 associated to the server 20. At power on, the CPU 30 downloads the program 310 into RAM 32 and executes its instructions.

RAM 32 comprises, especially:
- in a register 320, a program used by the CPU 30, that is downloaded at the power on of the server 20;
- various status in a register 321 (e.g. services related to one or several video devices 23); and
- various configuration data in a register 322 (e.g. frequencies used by one or several video devices 23).

Figure 4:
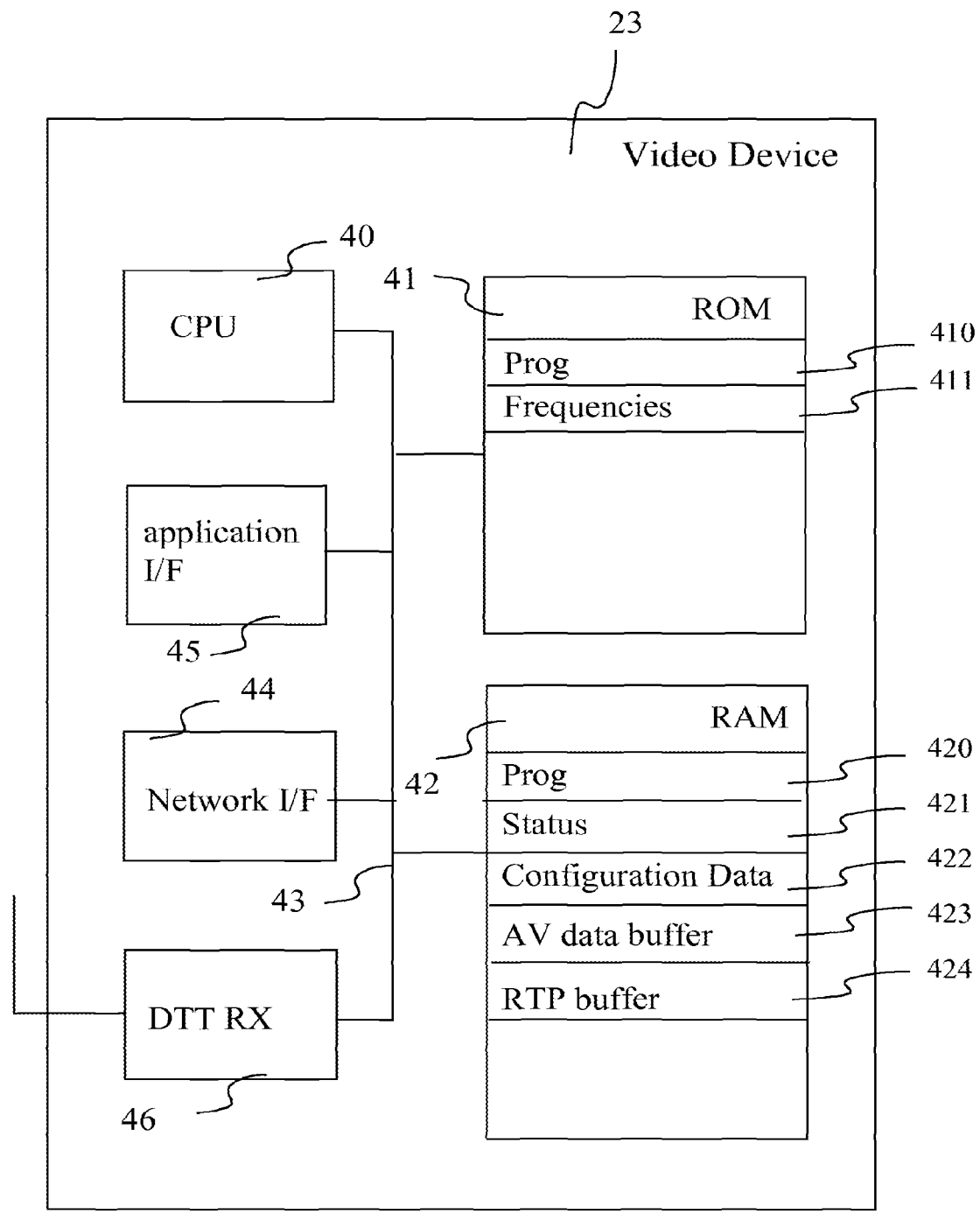

FIG. 4 illustrates schematically the video device 23. The video device 23, comprises:
- a microprocessor 40 (or CPU);
- a non-volatile memory of type ROM (e.g. flash memory or hard disk) 41;
- a RAM 42; et
- an application interface internet 45 enabling communication with a user, a display and/or an audio/video decoding, recording and/or playing device; the
- a network interface 44 enabling to exchange (send to and/or receive from) data or control frames (typically CWPM frames) with a configuration server 20 through the core network 21 and the gateway 20 associated to the video device; as summary, the interface 44 is a receiver of data from the distant remote management server 20;
  - a DTT reception block 46 including an antenna, RF (Radio Frequency) part and demodulator; the block 46 is a receiver of a digital terrestrial television signal through the DTT radio channel;
  - a data and address bus 43 linking elements 40 to 42 and 44 to 46.

Figure 6:
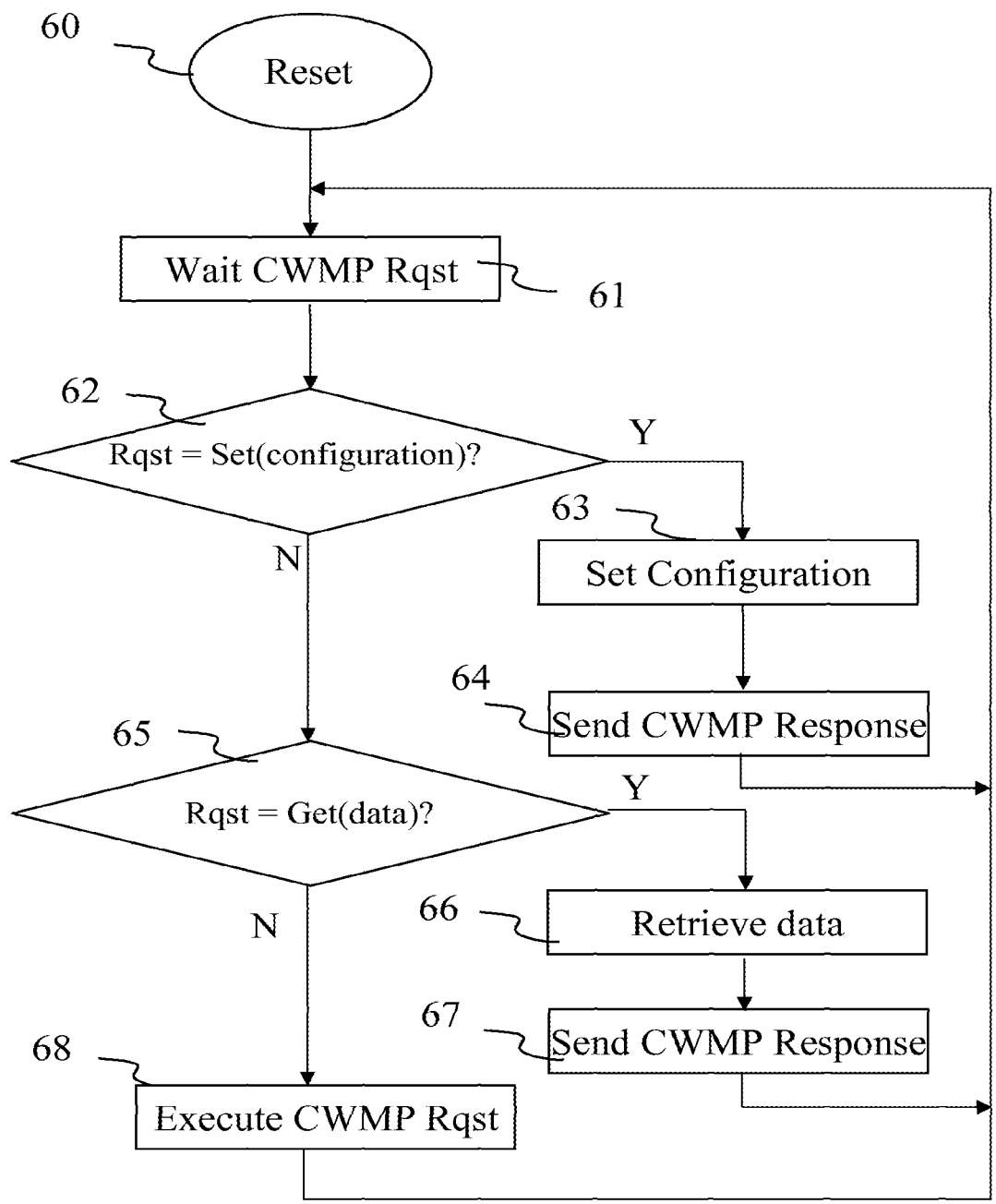

The ROM 41 comprises a program 410 and a list of frequencies that can be tuned by the DTT reception block 46. The algorithm implementing the method of FIG. 6 is stored in ROM 41 associated to the device 23. At power on, the CPU 40 downloads the program 410 into RAM 42 and executes its instructions.

RAM 42 comprises, especially:
- in a register 420, a program used by the CPU 40, that is downloaded at the power on of the device 23;
- various status in a register 421 (e.g. services received by the device 23);
- various configuration data in a register 422 (e.g. frequencies allocated to the device 23 by the server 20);
- an audio/video data buffer 423 that stores audio/video data received from a DTT transmitter 24 or 25; and
- an RTP buffer 424 that stores the RTP frames to send and RTP received frames.

The CPU 40, the ROM 41, the RAM 42, the receiver 46 and bus 43 are means for setting of one or several digital terrestrial television parameters related to a service list management according to a control command received through the second communication channel and requesting the video device 23 to set the digital terrestrial television parameters related to a service list management. Other structures or these means are possible according to the invention, especially pure hardware chip such as dedicated chip (e.g. an ASIC) or hardware elements integrated in the receiver 46 or a mix of hardware and software elements. Advantageously, the receiver 46 comprises programmable elements that can store a configuration of DTT physical parameters to use for DTT reception and receive accordingly the DTT signal(s). According to a variant, when the DTT parameters are not related to physical parameters to use for DTT reception, means for setting them does not include the DTT receiver and can include a purely software implementation (e.g. CPU with memory), a mix of software and hardware implementation (e.g. CPU, memory and dedicated chip) or a purely hardware implementation (e.g a dedicated chip).

FIG. 5 discloses a method that is implemented in the configuration server 20 according to the specific embodiments of the invention.

The method begins with a reset step 50, where the different configuration data of the server 20 itself are initialized (e.g. IP address of devices 23, their profiles, configuration data related to the audio/video broadcaster, user and/or control machine). The frequencies used by DTT transmitters can be set during this step manually by a user or automatically downloaded from a specific server. According to a variant of the invention, the frequencies are associated to information representative of specific geographic area(s) (that can receive DTT signals carried by the associated frequencies).

Then, during a step 51, the server 20 waits and receives a command from a user or control machine through the application interface 35 or from a video device. This command can be sent by a user (typically an operator) or control machine when the frequency mapping is changed (corresponding to a change of frequency and/or change of geographical coverage). It can also be sent by a video device following an installation, a reset, a request from a user, a DTT reception or configuration problem detected by the video device.

Then, during a step 52, the server 20 build a CWMP request according to the command received at step 51 and send it to one or several video devices 23 (according to the command).

Then, during a step 53, the server 20 waits and receives a response from each of the recipients of the CWMP request sent during step 52. As a variant, a time-out can be set up during the step 52 and the server waits a response till all expected answers are received or at expiration of time-out.

Then, during a step 54, the server send a status to the user or control machine that send the command during step 51, e.g. for display. Finally, step 51 is reiterated.

According to the invention several commands can be received by the server during step 51, especially:

a DTT frequency scan of one or several video devices; the frequency scan can relate to the whole frequency band allowed or to a part or several parts of it (e.g. part(s) can be defined by a start frequency and a stop frequency or a bandwidth); this command enables the video device(s) to scan a define frequency band; advantageously, this band is limited and adapted to the video device using a specific criteria (e.g. the geographical location of the video device or estimated quality of reception); this command enables also to take into account a change in a frequency map when the install of video device is already made and to force the video device to update the service parameters; it can also be used to test a video on specific frequency or frequencies;

selection of one or several DTT frequencies to use by one or several video devices;

selection of one or several DTT services to connect by one or several video devices; this can be used for remote test;

selection of one DTT logical channel to connect by one or several video devices; this can also be used for remote test (according to state of the art, the selection of a service or logical channel is done manually by a video device user).

The CWMP requests is following a structure of standard commands as defined in TR-069 as follows:

the request based upon SetParameterValues as defined in section A.3.2.1 of TR-069 in table 9 to send a configuration request to one or several video devices according to a step 51 command;

the request based upon GetParameterValues as defined in section A.3.2.5 of TR-069 in table 20 to send a request to one or several video devices for retrieval of data such as audience statistics relative to the video device usage or identification of probable cause of delivery problems.

The corresponding CWMP response related to a step 53 is following a structure of standard responses as defined in TR-069 as follows:

the response based upon SetParameterValuesResponse as defined in section A.3.2.1 of TR-069 in table 10 to retrieve the status of the configuration request from one or several video devices;

the response based upon GetParameterValuesResponse arguments as defined in section A.3.2.5 of TR-069 in table 21 to retrieve of data such as audience statistics relative to the video device usage or identification of probable cause of delivery problems.

For each command and/or response, specific type of information and format are given in table 1 which lists a complete data model at the end of this description. Main objects of the datamodel related to the above listed commands are detailed hereafter.

When command related to a configuration of the frequency is received during step 51, the configuration server 20 sends to the corresponding video device(s) 23 a request SetParameterValues including the object During step 53, the video device (s) answers with a response GetParameterValuesResponse.

Then, during a step 54, a status of a frequency used by the controlled video devices 23 is displayed. Finally, step 51 is reiterated.

Several scenarios are possible. Some of them are given as illustration of FIG. 7.

FIG. 6 discloses a method that is implemented in the video device 23 according to the specific embodiments of the invention.

The method begins with a reset step 60, where the different configuration data of the video device itself are initialized (e.g. IP address of server 20, its default profiles, data related to the audio/video broadcaster, user, reset of internal statistics, DTT frequencies that can be used . . . ).

Then, during a step 61, the video device 23 waits and receives a CWMP request from the server 20.

Then, during a test 62, the device 23 checks if the command corresponds to a configuration set, i.e. a request SetParameterValues related to one of the object used for configuration as described above.

If so, during a step 63, the device 23 sets the configuration according to the object and arguments used in the received configuration request. Then, during a step 64, the device 24 sends a response to the server 20, indicating that the configuration has been done. After the step 64, step 61 is reiterated.

After test 62, if the command does not correspond to a configuration set, during a test 65, the device 23 checks if the command corresponds to a data retrieval, i.e. a request GetParameterValues related to one of the object used for data retrieval as described above.

If so, during a step 66, the device 23 sends requested data according to the object and arguments used in the received request. Then, during a step 67, the device 23 sends a response to the server 20, with the requested statistic data. After the step 67, step 61 is reiterated.

Else, during a step 68, the device 23 executes the CWMP request and step 61 is reiterated.

Figure 7:
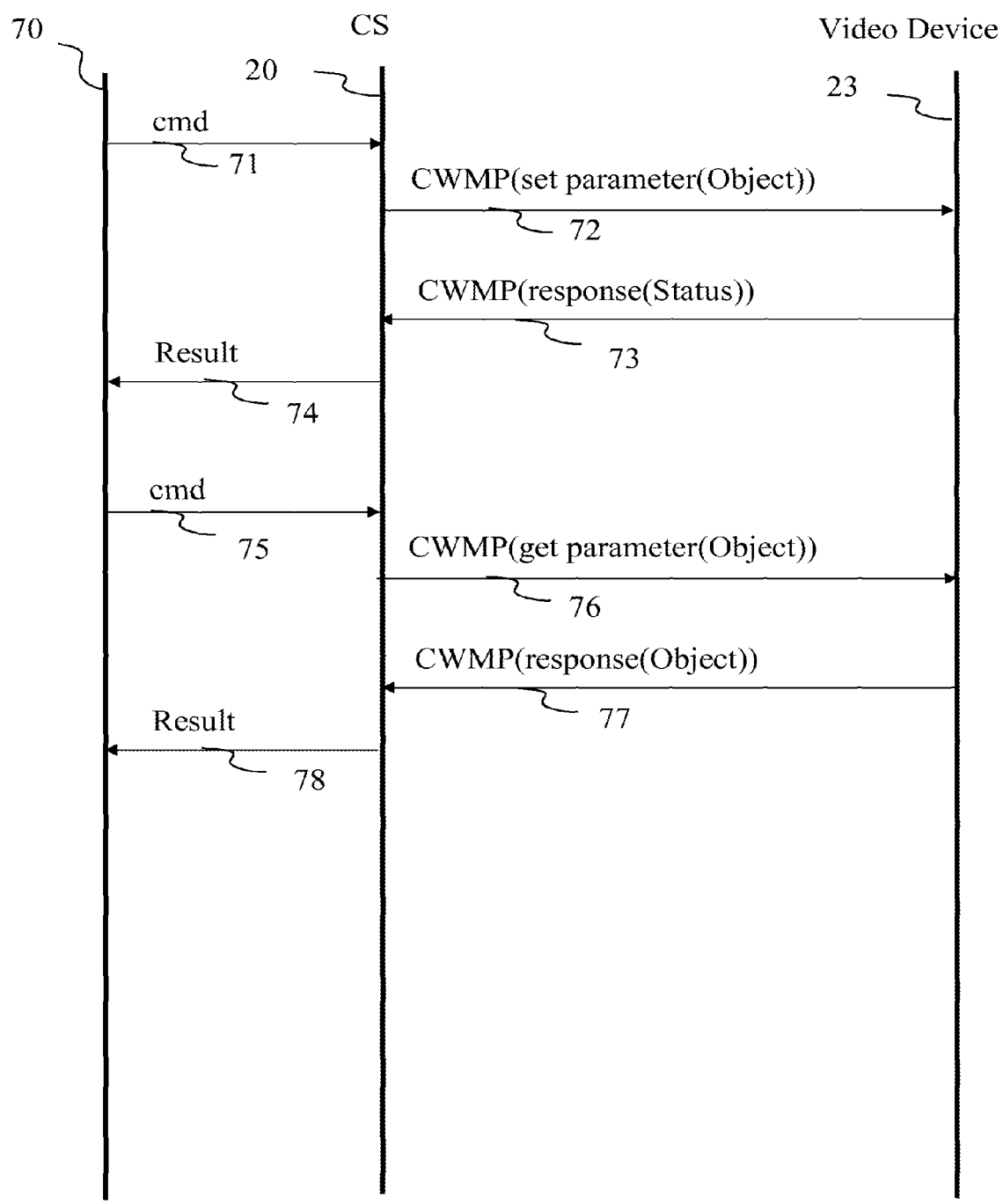
FIG. 7 presents an example of communication exchanges between elements of network of FIG. 2.

FIG. 7 presents an example of communication exchanges between server 20, device 23 and a user or control machine 70.

At reception of a configuration command 71 sent by the user or machine 70, the server 20 builds and sends a CWMP command 72 as indicated in step 52 of FIG. 5 to the video device 23.

Then, the video device 23 builds and sends back a response 73 as indicated in step 64 of FIG. 5 to the video device 23 and the result 74 of the configuration is given by the server 20 to the user or control machine 70.

At reception of a data request command 71 sent by the user or machine 70, the server 20 builds and sends a CWMP command 76 as indicated in step 52 of FIG. 5 to the video device 23.

Then, the video device 23 builds and sends back a response 77 as indicated in step 67 of FIG. 5 to the video device 23 and the required statistics data 78 of the configuration is given by the server 20 to the user or control machine 70.

An implementation of the invention enables to have, advantageously, a uniform protocol for the gateway and STB; as TR069 is used for gateway, the whole remote management system of video devices (STB) and gateway is simplified if it is also used for both devices. In addition, the protocol is reliable as RPC (remote procedure call) (rather than message exchange) is used over TCP: the get and set parameter functions are remotely made. More generally, the invention enables remote trouble shooting and remote configuration of a STB from a configuration server (e.g. an ACS). The data model according to the invention is compliant to the TR-069 framework and allows various operations of remote management using TR-069 protocols.

Furthermore, the invention is proposing a remote management method enabling a distant remote management server to manage DTT frequencies in a distant audio/video device. Advantageously, the management method comprises a transmission and/or reception step of a command and/or corresponding answer (e.g. CWMP commands and/or answer) associated to the management of allocated DTT frequencies. These frequency parameters can be precisely tuned according to various data that can be recovered by a server (for instance a configuration server), that are advantageously uploaded through the same protocol as the configuration protocol.

Many scenarios can be advantageously defined according to the invention and synergy exists between various configuration requests and/or data retrieval. Examples based on the syntax used in table 1 are given hereafter.

For instance, for DTT service list installation, a request is sent by the server 20 to the video device 23 and requests the video device 23 to scan at least a digital terrestrial television frequency (it can be one determined frequency (e.g. for testing), a set of frequencies and/or one or several frequency ranges). At reception of this request, the video device 23 scans the digital terrestrial television frequency(ies). According to a specific embodiment, the scenario includes the following successive steps:

- optional frequency mapping by setting frequency(ies) to scan (e.g. a frequency, frequencies or frequency range(s)); for this, the server 20 sends to the target video device(s) two or more commands SetParameterValues with the respective parameters STBService.{i}.Components.FrontEnd.{i}. Terrestrial.Install.StartFrequency and STBService.{i}. Components. FrontEnd.{i}. Terrestrial. Install.StopFrequency set to the desired frequencies;
- start of frequency scan; for this, the server 20 sends a command SetParameterValues to the video device(s) with the parameter STBService.{i}.Components.FrontEnd.{i}. Terrestrial.Install.Start set to 1.

As a variant, the frequency mapping is requested by the server 20 and the video device 23 starts automatically or not the frequency scanning after frequency mapping.

Then, any video device, which receives the above commands, starts the frequency scan in the given frequency range. As a variant, several separated ranges can be scanned. According to specific embodiments, the scan is made with one command of start or a start command sent after each range as defined.

As a variant, a reset of service list can be done before DTT service list installation. For this, the server 20 sends to the target video device(s) a command SetParameterValues with the parameter STBService.{i}.Components. FrontEnd.{i}.Terrestrial.ServiceListDatabase. reset set to true If useful or necessary, the server can get the state of the scan by getting parameters from a video device using the command GetParameterValues with the parameters related to status (STBService.{i}.Components. FrontEnd.{i}.Terrestrial.Install.Status) and/or progress (STBService.{i}.Components.FrontEnd.{i}.Terrestrial Install. Progress) of scan.

As a variant, other parameters of DTT physical channels used by the video device are managed by the distant server 23, especially the guard interval (using the field GuardInterval of install structure STBService.{i}.Components. FrontEnd.{i}.Terrestrial.Install.), the type of modulation (e.g. the used constellation using the field Constellation of install structure), the number of carriers in an OFDM frame (using the field Transmission mode in the install structure), the hierarchy coding parameter used for transmission (using the field HierarchyInformation of install structure), the code rate to use for scanning applied to high priority (or HP, using the field CodeRateHP in Install structure if hierarchy coding is used) or low priority (or LP, using the field CodeRateLP in Install structure if hierarchy coding is used), the channel bandwidth to use for scanning progress (using the field ChannelBandwidth in Install structure if hierarchy coding is used).

Advantageously, during install, the video device 23 stores in a memory all information related to DTT service list management and that can be requested by the server 20 through a request to get them. These information comprise scanned frequency(ies) or frequency(ies) to scan and more generally parameters of physical layer used by the video device 23 for DTT reception, associations between DTT logical channel and DTT service coordinates, information related to quality of reception (e.g. bit error rate or frame error rate associated to a received logical channel or service coordinate, before or after forward error correction, signal to noise ratio associated to a received logical channel or service coordinate), information related to the status of an DTT reception installation (e.g. level in the progression of a current installation, installation enabled or not), information related to the installed DTT service list (e.g. number of installed logical channel, number of logical channels associated to service list, identifiers of logical channels, number of services associated to each logical channel, transmitter frequency corresponding to a determined service coordinate and corresponding identifiers of service coordinate, preferred service coordinates, connected service coordinates).

For a specific association between a DTT logical channel and a DTT service coordinate, the scenario includes the following successive steps:

- get a service list data base using the command GetParameterValues with the parameters related to service list database (STBService.{i}.Components. FrontEnd.{i}.Terrestrial. ServiceListDatabase); the response comprises all the objects defined under the structure used as parameter in the command; this includes the number of services (NumberOfService), the number of logical channels (NumberOfLogicalChannel), the logical channel information associated to each logical channel (STBService.{i}.Components. FrontEnd.{i}.Terrestrial. ServiceListDatabase. LogicalChannel{i}, i being between 1 and NumberOfLogicalChannel).
- Browse the service list database looking for logical channel that are associated with more than one service coordinate;
- For at least one logical channel (and advantageously for each logical channel), that is associated with more than one service coordinate, check that the preferred service coordinate is associated with the best quality of reception (e.g. (lower BER or CBER or higher SNR) by looking at the data corresponding to the service information (STBService.{i}.Components. FrontEnd.{i}.Terrestrial. ServiceListDatabase.; LogicalChannel{i}.Service{i});
- If the preferred service coordinate is not associated with the best quality (or sufficient quality as a variant e.g. BER, CBER and/or SNR better than a given threshold) of reception by looking at the data corresponding to the service information, the server can force a new services list installation (reset of service list; for this, the server 20 sends to the target video device(s) a command SetParameterValues with the parameter STBService.{i}.Components.FrontEnd.{i}. Terrestrial.ServiceListDatabase.reset set to true and force frequency scan as described above); According to a variant, the server can set the "preferred" parameter to true for the service coordinate corresponding to the best (or sufficient) quality (lower BER or CBER or higher SNR) and to false for the previous preferred service coordinate;

The server 20 can also check the quality of reception of service coordinate associated with logical channel received by the video device 23, according to following scenario:

get the current association between a DTT logical channel and a DTT service coordinate using the command GetParameterValues with the parameters related to that instance "i" of logical channel (STBService.{i}.Components.
FrontEnd.{i}.Terrestrial.
ServiceListDatabase.LogicalChannel{i}, the response comprises all the objects defined under the structure used as parameter in the command; this includes the identifier of the logical channel (LogicalChannelNumber) the number of services (NumberOfService), the information associated to each service (STBService.{i}.Components.
FrontEnd.{i}.Terrestrial. ServiceListDatabase.
LogicalChannel{i}. Service.{i}, i being between 1 and NumberOfServices). Including Frequency, Service Coordinates (referred as DVBId, BER, SBER, SNR, Preferred)

Then look at the information of the service information to identify whether there are service coordinates associated with a logical channel and that do not have a sufficient quality of signal (as described above in the previous scenario).

The server 20 can also force the video device to connect to a determined service coordinate using the command SetParameterValues with the parameter STBService.{i}.Components.FrontEnd.{i}.DTT. ServiceConnect.DvbId set to the identifier of the service coordinate to connect.

The server 20 can also force the video device to connect to a the preferred service coordinate associated to a determined logical channel using the command SetParameterValues with the parameter STBService.{i}.Components.FrontEnd.{i}.DTT.LogicalChannelConnect.
LogicalNumber set to the identifier of the logical channel to connect.

Naturally, the invention is not limited to the embodiments described above.

In particular, other types or formats of request or response commands can be used according to the invention. In the description, examples based on TR069 have been given. Indeed, other functions compliant or not with TR069 can be implemented according to the invention.

In addition, structures, formats and names of objects (linked to configuration or statistics) are not limited to examples of table 1 and can be changed according to specific implementations of the invention. For example, boolean formats can be changed into string or integer formats; integer (respectively string) format can be changed into string (respectively integer format, an integer corresponding to a predefined argument). Other structures of objects are also compliant with the invention: for instance, some of structures defined in table 1 can be splitted into several structures (e.g. structures related to statistics with many possible arguments can be defined with several structures, each being related to one or several specific arguments), or, in the contrary gathered in one structure. Names of objects and arguments are given to illustrate a specific embodiment. Of course, they can be changed according to specific implementation. In addition, other configuration commands or statistics retrieval functions can be added to the above list.

Furthermore, all objects defined above are not mandatory in some specific implementation. For instance, frequency management can be implemented without DTT service management or DTT service management can be implemented without frequency management.

In addition, the invention is not limited to the used of CWMP protocol but concerns also any protocol that enable a server to apply remotely a configuration and/or data retrieval function directly on an object in a distant video device.

In particular, SNMP (or Simple Network Management Protocol) can be used instead of CWMP, and a MIB (Management Information Base) can be used instead of the WT-135 data model for the same functionality.

Alternatively XCAP (XML Configuration Access Protocol) as defined by IETF (or Internet Engineering Task Force) can also be used. XCAP allows a remote server to manage (create, delete, read, write and modify) per-user and per-application configuration data, stored as documents in XML format on a device that can be a video device. According to this variant an XML structure is used instead of the WT-135 data model for the same functionality.

The invention is not limited to the network structure of FIG. 2, but concerns also various structures including one or several management servers that can send commands to one or several remote devices, these devices being video devices or proxy associated to one or several video devices, directly or through a gateway. The video devices are not limited to set top boxes but concerns also TV sets, computer, laptop, fixed or mobile communication devices that can receive DTT services sent by radio . . . .

The invention concerns also computer programs or medium comprising such programs that contains instructions adapted to implement the management method (on server and/or video device side) according to the invention as defined above.

The invention concerns also a remote management model as defined above (e.g. in table 1) and to be used with a protocol such as CWMP.

According to a variant of invention, the requests are transmitted and responses are received through other protocol. It can be any communication protocol that enables data communication between a video device and a distant server. E.g. a request can comprise a message transmitted by a distant server to a DTT video device, with parameters identifying and/or describing the requests. A response can comprise a message transmitted by the DTT video device to the distant server, with information requested by the distant server.

In particular the invention concerns, a remote management model for a video device (eg. a STB or Set Top Box) allowing the operator to dynamically manage the DTT frequencies used by the set top box to receive digital programs.

The invention concerns also a server, a gateway, a proxy or a video device (eg. a STB) comprising means to implement a remote management model as described in this specification, and more generally networks or communication systems comprising such server(s) and/or video device(s).

Table 1 given in annex lists the objects associated with a STB CPE device and their associated parameters according to an embodiment of the invention. The notation used to indicate the data type of each parameter, and the notation associating with multi-instance objects, follows the notation defined in TR106 DSL Forum Technical Report (entitled "Home Network Data Model Template for TR-069-Enabled Devices").

The first column of table 1 represents the full name of a Parameter is the concatenation of the root object name as defined in TR106 DSL Forum Technical Report, the object name (in bold character), and the individual Parameter name.

The second column of table 1 represents the type of the parameter (eg object (that comprises one or several parameters), a string of 256 characters (noted string(256), a boolean, an unsigned integer (noted unsignedInt)).

The third column represents the write status, where "w" means writable and readable and "–" means readable only.

The fourth column describes the corresponding parameter(s).

In addition, main objects used by the management method according to the invention are in bold characters.

The following notations are used:
Logical Channel: corresponds to the number used by the user to select a service on his STB;
Service: corresponds to a DTT service coordinate or in case of DVB (or Digital Video Broadcast) to a DVB triplet (original_network_id, transport_stream_id, service_id).

On a DTT system there may be several services (and so several DVB triplets in case of DVB-T) corresponding to a single logical channel. The set top box (or STB) may thus be in a position to receive a same logical channel from several different transmitters. It has to select one of them. Usually it takes the service that has the best reception level (lowest BER).

The data model is structured so that logical channels can contain several instances of services.

There may be configurations (for example because one transmitter has been put in operation after the STB has been installed), where the STB can receive several services for the same logical channel, but is locked on the one with the lowest quality. The data model proposes to detect that and to change it. One way is to use the "preferred" writeable parameter (STBService.{i}.Components.FrontEnd.{i}.Terrestrial.ServiceListDatabase.LogicalChannel{i}.Service{i}.Preferred) that allows to force one particular service for a logical channel (the one with the best QoS (lower BER). Another way is to force an installation of a service list that logically will select the service coordinate with the best quality.

There may also be some cases where the help desk could want to force the connection of the STB onto a dedicated service. The data model proposes a way to do it either on a DVB triplet basis, or on the logical channel basis.

TABLE 1

| ANNEX: Parameter list for a video device (e.g. a STB CPE device) according to the invention | | | |
| --- | --- | --- | --- |
| .STBService.{i}.Components.FrontEnd.{i}.Terrestrial | object | — | Digital Terrestrial Television front-end details |
| .STBService.{i}.Components.FrontEnd.{i}.Terrestrial.Install | object | — | Forces a terrestrial installation using a scanning process to detect transmitters |
| Start | boolean | W | Forces (when set to 1) or stops (when set to 0) a scanning for terrestrial installation using following parameters. This may run several times for a same service list if the frequency spectrum is not continuous. To force a re-install (or new install), the service list is reset before (see .STBService.{i}.Components.FrontEnd.{i}.Terrestrial.ServiceListDatabase.reset) |
| Status | string | — | Indicates the status of the scanning process: "Enabled" (scanning is in progress) "Disabled" (scanning is stopped) |
| Progress | unsignedInt | — | Progression in percentage for current installation |
| GuardInterval | string | W | Guard interval to use for the scanning. Enumeration of: "1/32", "1/16", "1/8" and/or "1/4" |
| Constellation | string | W | Indicates the constellation to use for the scanning. Enumeration of: "QPSK", "16QAM" and/or "64QAM" |
| TransmissionMode | string | W | Indicates the number of carriers in an OFDM frame. Enumeration of: "2k" and/or "8k" |
| HierarchyInformation | string | W | Hierarchical parameter alpha. The higher the value of alpha, the more noise-immune the High Priority Modulation is. Enumeration of: "1" (no hierarchy), "2" or "4" |

TABLE 1-continued

ANNEX: Parameter list for a video device (e.g. a STB CPE device) according to the invention

| | | | |
|---|---|---|---|
| CodeRateHP | string | W | Indicates the code rate to use for the scanning. Code rate applies to HP in case of hierarchical coding. Enumeration of: "1/2", "2/3", "3/4", "5/6" and/or "7/8" |
| CodeRateLP | string | W | Indicates the current code rate to use for the scaning. Code rate applies to LP in case of hierarchical coding. Enumeration of: "0" Coding is not hierarchical "1/2", "2/3", "3/4", "5/6" and/or "7/8" |
| ChannelBandwidth | string | W | Indicates the channel bandwidth to use for a scanning process, this value is used as the increment between 2 successive frequencies. Enumeration of: "8 MHz", "7 MHz" and/or "6 MHz" |
| StartFrequency | unsignedInt | W | Frequency (in kHz) to start scanning process |
| StopFrequency | unsignedInt | W | Frequency (in kHz) to stop scanning process |
| .STBService.{i}.Components.FrontEnd.{i}.Terrestrial.ServiceListDatabase | object | — | Services information relative to the terrestrial installation |
| Reset | boolean | W | When set to true, resets the service list database |
| NumberOfService | unsignedInt | — | Number of services installed in the service list |
| NumberOfLogicalChannel | unsignedInt | — | Number of logical channels associated to the service list |
| .STBService.{i}.Components.FrontEnd.{i}.Terrestrial.ServiceListDatabase.LogicalChannel{i} | object | — | Logical channel information |
| LogicalChannelNumber | unsignedInt | — | Logical channel identifier |
| NumberOfServices | unsignedInt | — | Number of services associated to this logical channel |
| .STBService.{i}.Components.FrontEnd.{i}.Terrestrial.ServiceListDatabase.LogicalChannel{i}.Service{i} | object | — | Service information |
| Frequency | unsignedInt | — | Transmitter frequency corresponding to the service |
| DvbId | string | — | DVB Triplet used to identify one service in the service list database. DVB Triplet is composed of Original Network Id, Service Id, Transport Stream Id. This parameter is a string containing a concatenation of the different elements of the DVB triplet expressed in hexadecimal format Example: OriginalNetworkId = 0x20FA TransportStreamId = 0x0004 ServiceId = 0x0101 Resulting in DvbId = "20FA00040101" |
| BER | unsignedInt | — | Identifies the quality of the service as a Bit Error Rate before correction |
| CBER | unsignedInt | | Bit Error Rate after correction. |
| SNR | unsignedInt | | Signal/Noise ratio in the carrier band, measured in dB |

TABLE 1-continued

ANNEX: Parameter list for a video device (e.g. a STB CPE device) according to the invention

| | | | |
|---|---|---|---|
| Preferred | boolean | W | If set to true, identifies the service as preferred when selecting this logical channel. Other services associated to this logical channel must have this field set to false. By default, this field is set to true for the service having the lower BER (Byte Error Rate corresponding to the best received quality) |
| .STBService.{i}.Components.FrontEnd.{i}.DTT.ServiceConnect | object | — | Connect to a service |
| DvbId | string | W | DvbId (DVB Identifier) of the service to connect |
| .STBService.{i}.Components.FrontEnd.{i}.DTT.LogicalChannelConnect | object | — | Connect to a logical channel |
| LogicalNumber | unsignedInt | W | Identifier of the logical channel to connect: connection is performed on the preferred service associated to this logical channel |

The invention claimed is:

1. A remote management method implemented by a remote management server enabling the remote management server to manage at least a distant video device, the method comprising:
   transmitting, by the remote management server, a first request for obtaining service list information from said at least a distant video device;
   receiving, from said at least one distant video device, said service list information in response to said first request;
   for at least one logical channel that is associated with more than one service coordinate, checking, according to said service list information, if a preferred service coordinate is associated with a digital terrestrial television service having a first quality of reception; and
   transmitting, by the remote management server, a second request to said at least a distant video device when the preferred service coordinate is not associated with the digital terrestrial television service having the first quality of reception, the second request requesting the at least a distant video device to scan a digital terrestrial television frequency and to set at least a digital terrestrial television parameter related to a digital terrestrial television service list management, for associating said preferred service coordinate with said digital terrestrial television service having the first quality of reception.

2. The remote management method according to claim 1, wherein the first quality of reception is one of:
   a Bit Error Rate; or
   a Signal to Noise Ratio.

3. The method according to claim 1, wherein the transmitting of said second request comprises sending of a request for the at least a distant video device to associate at least a logical channel with a digital terrestrial television service coordinate.

4. A remote management method implemented by a video device wherein the video device is adapted to receive a digital terrestrial television service, the method comprising:
   receiving a first request from a remote management server, for obtaining service list information;
   transmitting, to the remote management server, said service list information in response to said first request;
   receiving a second request from said remote management server when a preferred service coordinate is not associated with a digital terrestrial television service having a first quality of reception, the second request requesting the video device to scan a digital terrestrial television frequency and to set at least a digital terrestrial television parameter related to a digital terrestrial television service list management for associating said preferred service coordinate with said digital terrestrial television service having the first quality of reception;
   setting the at least a digital terrestrial television parameter related to the digital terrestrial television service list management; and
   transmitting a response to said second request to said remote management server.

5. The remote management method according to claim 4, wherein the first quality of reception is one of:
   a Bit Error Rate; or
   a Signal to Noise Ratio.

6. The method according to claim 4, wherein the second request comprises a request for the video device to associate at least a digital terrestrial television logical channel with a digital terrestrial television service coordinate.

7. The method according to claim 4, further comprising transmitting information related to the digital terrestrial television service list management to the management server.

8. The method according to claim 4, wherein a communication channel for the remote management is of an Internet Protocol type.

9. The method according to claim 4, wherein the first and the second request is received according to a Customer Premises Equipment Wide Area Network Management Protocol.

10. A video device for receiving digital terrestrial television services, wherein the video device comprises:
   a network interface configured to receive, a first request from a remote management server, for obtaining service list information;
   the network interface further configured to transmit, to the remote management server, said service list information in response to said first request;

a receiver configured to receive a second request from said remote management server when a preferred service coordinate is not associated with a digital terrestrial television service having a first quality of reception, the second request requesting the video device to scan a digital terrestrial television frequency and to set at least a digital terrestrial television parameter related to a digital terrestrial television service list management for associating said preferred service coordinate with said digital terrestrial television service having the first quality of reception;

a processing unit configured to set the at least a digital terrestrial television parameter related to the digital terrestrial television service list management; and the network interface further configured to transmit a response to said second request to said remote management server.

11. The video device according to claim 10, further comprising means for receiving a request for the video device, comprised in the second request, to associate at least a digital terrestrial television logical channel with a digital terrestrial television service coordinate.

12. The video device according to claim 10, further comprising means for transmitting information related to a digital terrestrial television service list management to the management server.

13. The video device according to claim 10, wherein the network interface is of an Internet Protocol type.

14. The video device according to claim 10, wherein the network interface is further configured to receive the first and the second request according to a Customer Premises Equipment Wide Area Network Management Protocol.

15. A video device for reception of digital terrestrial television services, wherein the video device comprises:

a receiver arrangement operably configured to receive a digital terrestrial television service;

a network interface operably configured to receive configuration data from a remote management server;

said network interface being further operably configured to receive a first request from said remote management server, for obtaining service list information;

said network interface being further operably configured to transmit, to the remote management server, said service list information in response to said first request;

said receiver arrangement being further operably configured to receive a second request from said remote management server when a preferred service coordinate is not associated with a digital terrestrial television service having a first quality of reception, the second request requesting the video device to scan a digital terrestrial television frequency and to set at least a digital terrestrial television parameter related to a digital terrestrial television service list management for associating said preferred service coordinate with said digital terrestrial television service having the first quality of reception;

a processing unit operably configured to set the at least a digital terrestrial television parameter related to the digital terrestrial television service list management; and said network interface being further operably configured to transmit a response to said second request to said remote management server.

16. The video device according to claim 15, wherein the network interface is further operably configured to receive a request for the video device, comprised in the second request, to associate at least a digital terrestrial television logical channel with a digital terrestrial television service coordinate.

17. The video device according to claim 15, wherein the network interface is further operably configured to transmit information related to a digital terrestrial television service list management to the remote management server.

18. The video device according to claim 15, wherein the network interface is of an Internet Protocol type.

19. The video device according to claim 15, wherein the network interface is further operably configured to receive the first and the second request according to a Customer Premises Equipment Wide Area Network Management Protocol.

20. A remote management server for managing at least a distant video device, wherein the remote management server comprises:

a network interface configured to transmit a first request for obtaining service list information from said at least a distant video device;

said network interface configured to receive, from the at least a distant video device, the service list information in response to the first request;

a processor configured to check, according to the service list information and for at least one logical channel that is associated with more than one service coordinate, if a preferred service coordinate is associated with a digital terrestrial television service having a first quality of reception; and said network interface configured to transmit a second request to said at least a distant video device when the preferred service coordinate is not associated with the digital terrestrial television service having the first quality of reception, the second request requesting the at least a distant video device to scan a digital terrestrial television frequency and to set at least a digital terrestrial television parameter related to a digital terrestrial television service list management, for associating said preferred service coordinate with said digital terrestrial television service having the first quality of reception.

21. The remote management server according to claim 20, wherein the sending of said second request comprises sending of a request for the at least a distant video device to associate at least a logical channel with a digital terrestrial television service coordinate and the network interface is further configured to transmit said second request comprising sending of said request for the at least a distant video device to associate at least a logical channel with a digital terrestrial television service coordinate.

* * * * *